(12) United States Patent
Dawkins

(10) Patent No.: US 11,667,113 B2
(45) Date of Patent: Jun. 6, 2023

(54) BADGES AND METHODS FOR MAKING BADGES

(71) Applicant: All Access Name Tags & Credentials LLC, Troy, MI (US)

(72) Inventor: Mitchell L. Dawkins, Troy, MI (US)

(73) Assignee: All Access Name Tags & Credentials LLC, Troy, MI (US)

( * ) Notice: Subject to any disclaimer, the term of this patent is extended or adjusted under 35 U.S.C. 154(b) by 0 days.

(21) Appl. No.: 17/187,177

(22) Filed: Feb. 26, 2021

(65) Prior Publication Data

US 2021/0268784 A1    Sep. 2, 2021

Related U.S. Application Data

(60) Provisional application No. 62/982,855, filed on Feb. 28, 2020.

(51) Int. Cl.
*B32B 38/00*  (2006.01)
*B32B 37/00*  (2006.01)

(52) U.S. Cl.
CPC ...... *B32B 38/0004* (2013.01); *B32B 37/0053* (2013.01); *B32B 2037/0092* (2013.01); *B32B 2425/00* (2013.01)

(58) Field of Classification Search
CPC ........ B32B 2425/00; B32B 2037/0092; B32B 2037/0061; B32B 2037/0069; B32B 37/0053; B32B 37/0076; B32B 37/1292; B32B 37/185; B32B 37/226; B32B 37/30; B32B 38/0004; B32B 38/04; B32B 38/105; B32B 38/14; B32B 38/145; B32B 38/1808; B32B 38/1816; B32B 2038/045; B42D 25/45–475; G09F 3/207; A44C 3/001; A44C 3/002; A45C 11/182; Y10T 156/108; Y10T 156/1084; Y10T 156/1095
USPC ..... 156/289, 324, 269, 271, 290, 291, 308.4
See application file for complete search history.

(56) References Cited

U.S. PATENT DOCUMENTS

2007/0022647 A1 *  2/2007  Miller ................... B32B 27/08
                                                          40/654.01

FOREIGN PATENT DOCUMENTS

| DE | 3900165 A1 | * | 7/1990 | .......... A45C 11/182 |
| EP | 1642711 A2 | * | 4/2006 | ............... B42F 7/06 |
| FR | 2970799 A1 | * | 7/2012 | ............. B32B 27/10 |
| GB | 2359275 A  | * | 8/2001 | ......... B32B 38/0004 |

OTHER PUBLICATIONS

Machine translation of DE 3900165 date unknown.*
Machine translation of FR 2970799 date unknown.*

* cited by examiner

*Primary Examiner* — John L Goff, II
(74) *Attorney, Agent, or Firm* — Darrow Mustafa PC

(57) ABSTRACT

A method for making a badge includes laminating a printed substrate with a back side laminate sheet and a front side laminate sheet and disposing a barrier sheet between at least one of the back side laminate sheet and the printed substrate and the front side laminate sheet and the printed substrate. And a side loading pocket section is formed between at least one of the back side laminate sheet and the printed substrate and the front side laminate sheet and the printed substrate.

14 Claims, 13 Drawing Sheets

BADGES AND METHODS FOR MAKING BADGES

FIELD

The present disclosure relates to badges and methods of making badges.

BACKGROUND

The statements in this section merely provide background information related to the present disclosure and may not constitute prior art.

Badges, e.g., event badges, for individuals attending events such as conferences, concerts, athletic events, among others, typically include a laminated printed substrate with images and/or indicia and a method or technique for attaching the badges to individuals. For some events, individuals can register at the event (also known as "on-site registration") by providing their name, contact information and/or company information to registration personnel or entering such information into a computer, for which an information tag is printed (e.g., a name tag). The information tag is then attached to a pre-formed laminated printed substrate (event badge) and provided to the individuals to display (i.e., wear) during the event. However, providing pre-formed event badges that are designed and configured for an on-site generated information tag to be attached to in an aesthetically pleasing manner can require a longer than desired lead time to produce such badges before the event.

Issues related to providing pre-formed event badges for on-site registration and other issues related to the manufacture of badges are addressed by the teachings of the present disclosure.

SUMMARY

In one form of the present disclosure a method for making a badge includes laminating a printed substrate with a back side laminate sheet and a front side laminate sheet and disposing a barrier sheet between at least one of the back side laminate sheet and the printed substrate and the front side laminate sheet and the printed substrate such that a side loading pocket section is formed between at least one of the back side laminate sheet and the printed substrate and the front side laminate sheet and the printed substrate.

In some variations of the present disclosure, the barrier sheet is laminated to the back side laminate sheet and the side loading pocket section is formed between the back side laminate sheet and the printed substrate. In other variations the barrier sheet is laminated to the front side laminate sheet and the side loading pocket section is formed between the front side laminate sheet and the printed substrate. In at least one variation the barrier sheet is laminated to the back side laminate sheet and another barrier sheet is laminated to the front side laminate sheet, and the side loading pocket section is formed between the back side laminate sheet and the printed substrate and another side loading pocket section is formed between the front side laminate sheet and the printed substrate.

In some variations the back side laminate sheet comprises an adhesive layer on an inner surface of the back side laminate sheet, the front side laminate sheet comprises another adhesive layer on an inner surface of the front side laminate sheet, and the barrier sheet comprises still another adhesive layer an outer surface of the barrier sheet. In such variations an inner surface of the barrier sheet facing the printed substrate is free of an adhesive.

In at least one variation more than 50% of an area of an inner surface of the barrier sheet facing the printed substrate is not adhesively attached to the printed substrate. In some variations more than 75% of an area of an inner surface of the barrier sheet facing the printed substrate is not adhesively attached to the printed substrate. In at least one variation more than 90% of an area of an inner surface of the barrier sheet facing the printed substrate is not adhesively attached to the printed substrate.

In some variations the method includes cutting the laminated printed substrate along a side edge such that a side opening is formed between the barrier sheet and the printed substrate. For example, In at least one variation the method includes cutting the laminated printed substrate along a pair of side edges such that a pair of side openings are formed between the barrier sheet and the printed substrate.

In some variations the printed substrate, the back side laminate sheet, the front side laminate sheet, and the barrier sheet are fed into a laminator such that the back side laminate sheet is laminated to a back side of the printed substrate, the barrier sheet is positioned between the front side laminate sheet and the printed substrate, and the front side laminate sheet is laminated to a front side of the printed substrate except where the barrier sheet is positioned between the front side laminate sheet and the printed substrate. In such variations the barrier sheet is laminated to the front side laminate sheet and not laminated to the printed substrate.

In some variations, one or more badges are provided by the method.

In another form of the present disclosure, a method of forming a plurality of badges includes printing a plurality of images on a front side of a substrate to form a plurality of printed badge substrates, feeding the substrate, a front side laminate sheet, and a barrier sheet into a laminator. The barrier sheet is positioned between the front side laminate sheet and the front side of the substrate and extends across the plurality of printed badge substrates. Also, the front side laminate sheet is laminated to the front side of the substrate and a side loading pocket is formed between the front laminate sheet and the plurality of printed badge substrates where the barrier sheet is positioned. In some variations the method includes cutting the substrate to form the plurality of badges such each of the plurality of badges comprises a side loading pocket.

In some variations, a plurality of badges are provided by the method.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
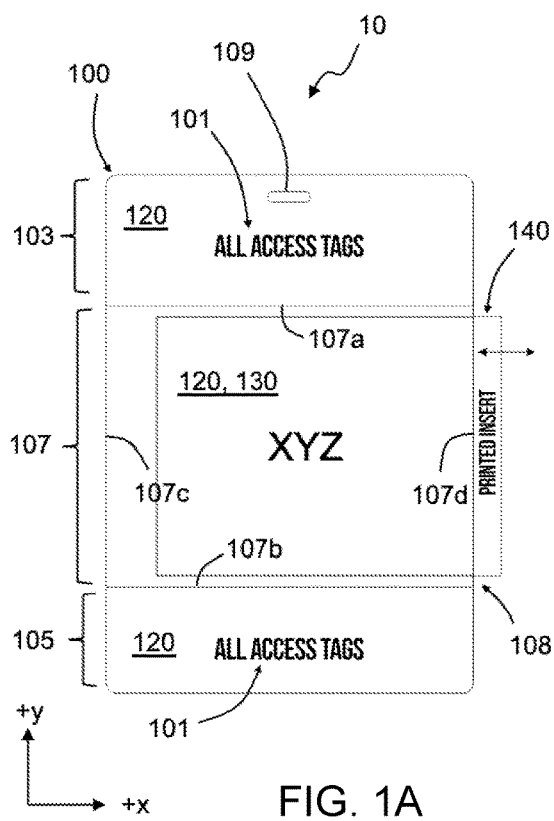
FIG. 1A is a front view of a badge in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
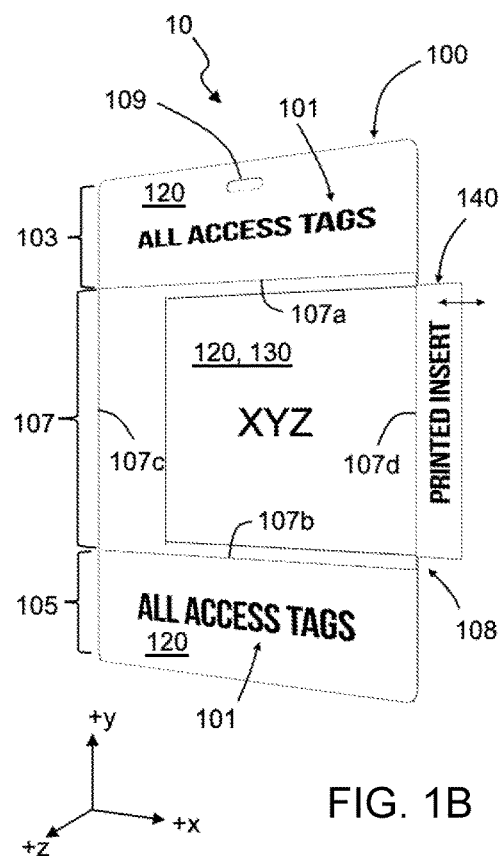
FIG. 1B is a perspective view of the badge in FIG. 1A.
Figure 1C:
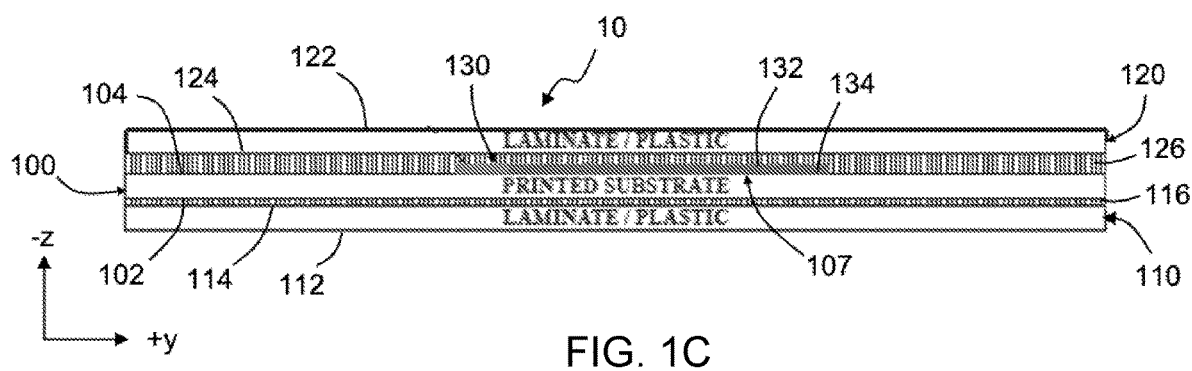
FIG. 1C is a side view of the badge in FIG. 1A.

Referring now to FIGS. 1A-1C, a badge 10 (e.g., an event badge) according to one form of the present disclosure is shown. The badge 10 includes a printed substrate 100 with a top (+y direction) section 103, a bottom (−y direction) section 105, and a pocket section 107. In some variations of the present disclosure, the top section 103 and/or the bottom section 105 include indicia and/or an image 101, and an aperture 109 for assisting in attaching (e.g., hanging or pinning) the badge to an individual. Also, the pocket section 107 is bounded by a top (+y direction) seal 107a and a bottom (−y direction) seal.

The printed substrate 100 has a back side 102 and a front side 104 (FIG. 1C). Extending across the back side 102 is a back side laminate sheet 110 and extending across the front side 104 is a front side laminate sheet 120. As shown in FIG. 1C, the back side laminate sheet 110 has an outer surface 112 and an inner surface 114. Also, in some variations of the present disclosure, an adhesive 116 (e.g., an adhesive layer) is disposed between the inner surface 114 of the back side laminate sheet 110 and the back side 102 of the substrate 100.

The front side laminate sheet 120 has an outer surface 122 and an inner surface 124. In some variations, an adhesive 126 (e.g., an adhesive layer) is disposed between the inner surface 124 of the front side laminate sheet 120 and the front side 104 of the printed substrate 100. Accordingly, the back side 102 of the printed substrate 100 is laminated with the back side laminate sheet 110 where the adhesive 116 is disposed between and in contact with the back side laminate sheet 110 and the printed substrate 100. Also, the front side 104 of the printed substrate 100 is laminated with the front side laminate sheet 120 where the adhesive 126 is disposed between and in contact with the front side laminate sheet 120 and the printed substrate 100. However, a barrier sheet 130 provides a barrier between the adhesive 126 on the inner surface 124 of the front side laminate sheet 120 and the front side 104 of the substrate 100, thereby forming the pocket section 107. That is, the barrier sheet 130 is disposed between the front side laminate sheet 120 and the printed substrate 100 and the front side laminate sheet 120 is not laminated or bonded to the printed substrate 100 across the pocket section 107 between the top seal 107a and the bottom seal 107b. In some variations the barrier sheet 130 is a laminate sheet while in other variations the barrier sheet 130 is not a laminate sheet, i.e., the barrier sheet 130 is a transparent or translucent plastic sheet without adhesive on an outer surface 132 or an inner surface 134.

Still referring to FIGS. 1A-1C, a side edge 107c and/or a side edge 107d (FIGS. 1A-1B) of the pocket section 107 is not sealed to the printed substrate 100 such that a side loading pocket 108 is formed on the badge 10. Also a printed insert 140 is inserted and positioned within the pocket section 107, i.e., the side loading pocket 108, between the front side laminate sheet 120 and the front side 104 of the printed substrate 100. It should be understood that the printed insert 140 can include indicia 'XYZ' and can slide in and out (+/−x directions) of the side loading pocket 108 as shown by the double headed arrow in FIGS. 1A-1B. It should also be understood that the front side laminate sheet 120 and the barrier sheet 130 can be transparent such that an individual can view and read, the indicia XYZ on the printed insert 140 after it has been inserted into the side loading pocket 108.

Figure 2:
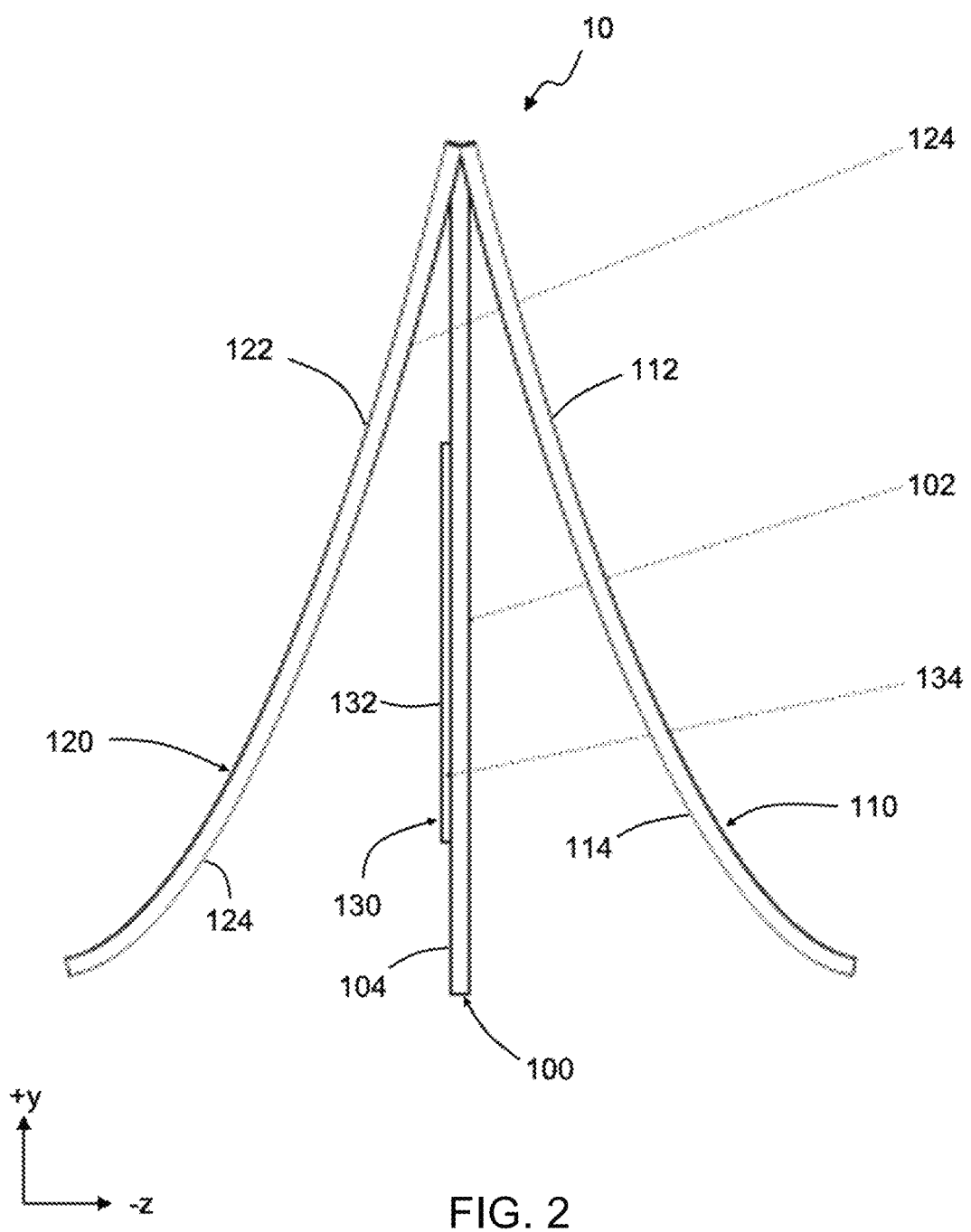
FIG. 2 is a side view of the badge in FIG. 1A with a front side laminated sheet and a back side laminated sheet peeled away from a printed substrate.

Referring now to FIG. 2, the badge 10 with the back side laminate sheet 110 and the front side laminate sheet 120 peeled away from the printed substrate 100 is shown. The barrier sheet 130 has the outer surface 132 facing the inner surface 124 of the front side laminate sheet 120 and the inner surface 134 facing the front side 104 of the printed substrate 100. Also, the barrier sheet 130 is disposed between the inner surface 124 of the front side laminate sheet 120 and the front side 104 of the printed substrate 100. In some variations of the present disclosure, the back side laminate sheet 110 and the front side laminate sheet 120 are laminated to the printed substrate 100 as described in greater detail below.

Figure 3:
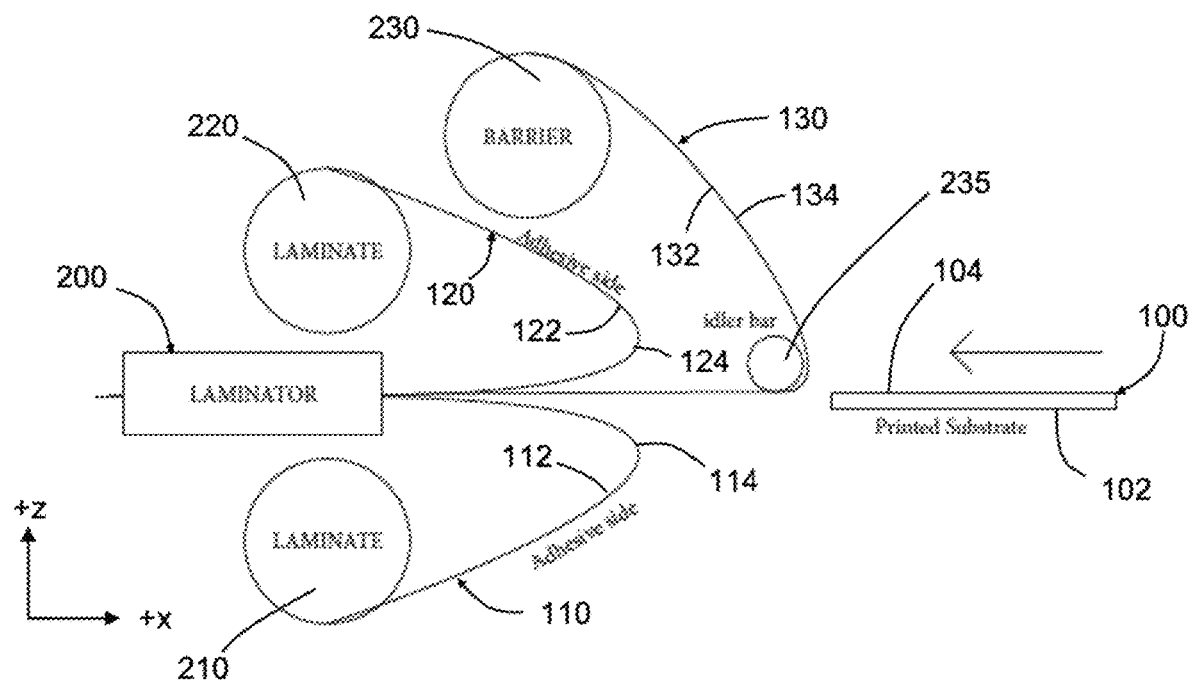
FIG. 3 is a side view of a method for forming a badge in accordance with the teachings of the present disclosure.

Referring now to FIG. 3, a side view of a laminator 200 forming a badge 10 is shown. Particularly, the printed substrate 100, the back side laminate sheet 110, the front side laminate sheet 120 and the barrier sheet 130 are being fed into the laminator 200 to form the badge 10. In some variations of the present disclosure the back side laminate sheet 110 is provided from a roll of laminate sheet 210, the front side laminate sheet 120 is provided from a roll of laminate sheet 220, and the barrier sheet 130 is provided from a roll of laminate sheet 230. In at least one variation an idler roller 235 is used to assist in feeding the barrier sheet 130 into the laminator 200 between the front side laminate sheet 120 and the printed substrate 100.

In some variations, the roll of laminate sheet 210 provides the back side laminate sheet 110 with the adhesive 116 on the inner surface 114 and the roll of laminate sheet 220 provides the front side laminate sheet 120 with the adhesive 126 on the inner surface 124. That is, the back side laminate sheet 110 with the adhesive 116 on the inner surface 114 is fed into or supplied to the laminator 200 from the roll of laminate sheet 210 and the front side laminate sheet 120 with the adhesive 126 on the inner surface 124 is fed into or supplied to the laminator 200 from the roll of laminate sheet 220. It should be understood that lamination of the front side laminate sheet 120 to the front side 104 of the substrate 100 does not occur where the barrier sheet 130 is between the front side laminate sheet 120 and the substrate 100. Also, at least a portion of the inner surface 134 of the barrier sheet 130 does not laminate or bond to the front side 104 of the printed substrate 100 such that the pocket section 107 is formed or provided on the front side 104 between the top section 103 and the bottom section 105.

Figure 4:
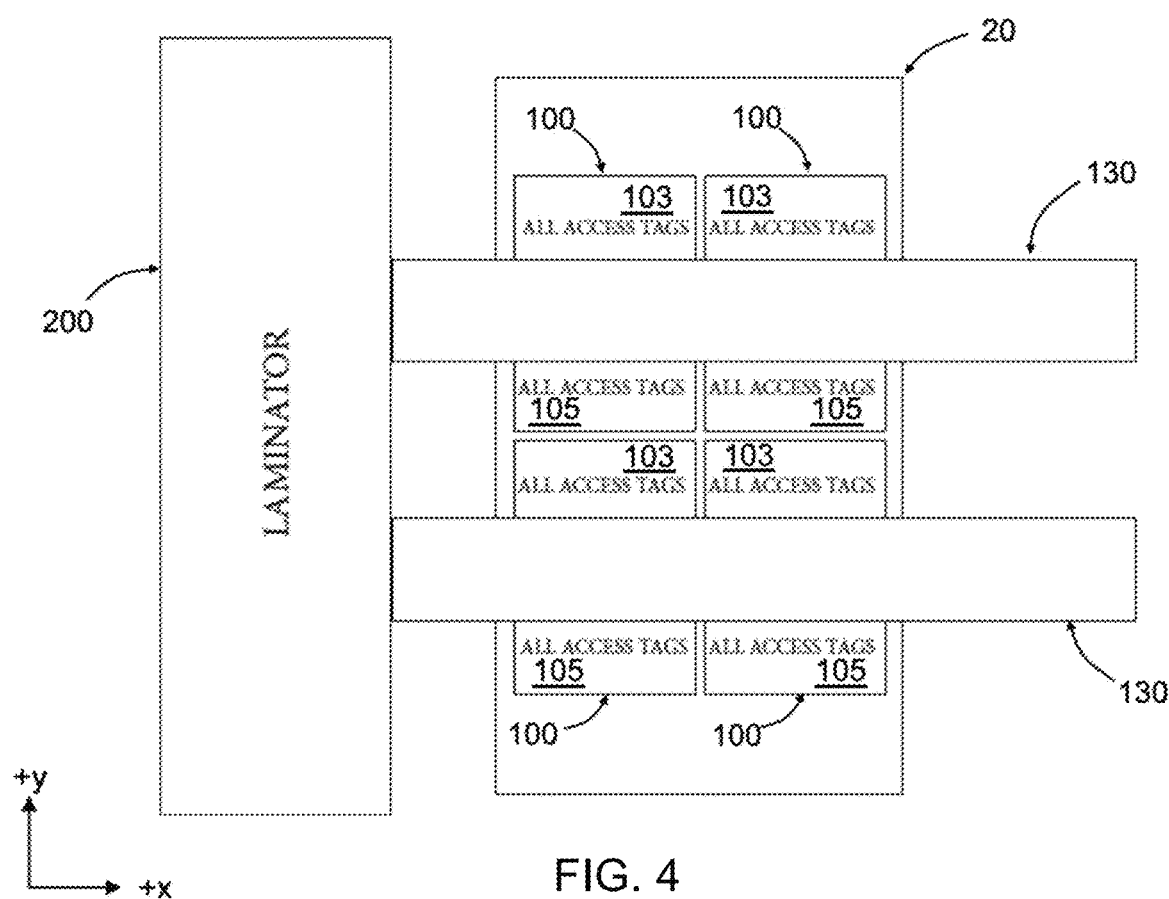
FIG. 4 is a front view of a method for laminating a plurality of badges in accordance with the teachings of the present disclosure.

Referring now to FIG. 4, a top view of a laminator 200 forming a plurality of badges 10 is shown. Particularly, a panel 20 (e.g., a piece of paper or card stock used for forming badges) comprising a plurality of printed substrates 100, the back side laminate sheet 110 (not shown), the front side laminate sheet 120 (not shown), and two barrier sheets 130 are fed into a laminator 200. Each of the two barrier sheets 130 extend across a subset of the plurality of printing substrates 100 between a top section 103 and a bottom section 105. As the panel 20 and the back side laminate sheet 110 pass through the laminator 200, a combination of heat provided by the laminator 200 and the adhesive 116 on the inner surface 114 of the back side laminate sheet 110 result in lamination (i.e., bonding) of the back side laminate sheet 110 to the back side 102 of each of the printed substrates 100. Also, as the panel 20, the front side laminate sheet 120, and the barrier sheets 130 pass through the laminator 200, a combination of heat provided by the laminator 200 and the adhesive 126 on the inner surface 124 of the front side laminate sheet 120 result in lamination of the front side laminate sheet 120 to the top section 103 and the bottom section 105 on the front side 104 of each of the printed substrates 100. The front side laminate sheet 120 also laminates to the barrier sheets 130 but does not laminate to the front side 104 of each of the printed substrates 100 between the top section 103 and the bottom section 105. Accordingly, a non-laminated area (i.e., a pocket section 107) is provided or defined between the top section 103 and the bottom section 105 of each of the plurality of printed substrates 100 as shown in FIG. 5.

Figure 5:
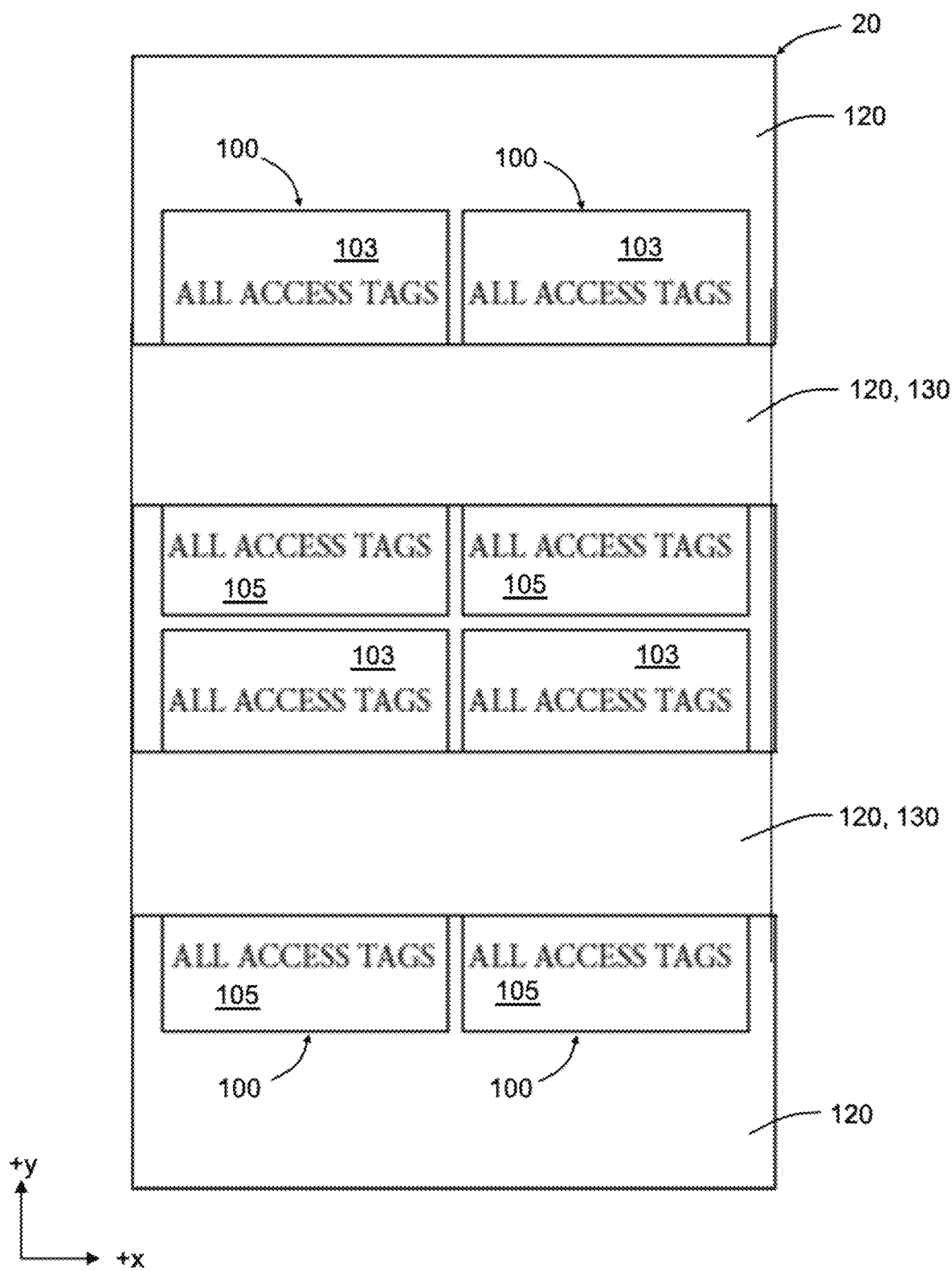
FIG. 5 is front view of a plurality of laminated badges with side loading pockets in accordance with the teachings of the present disclosure.
Figure 6:
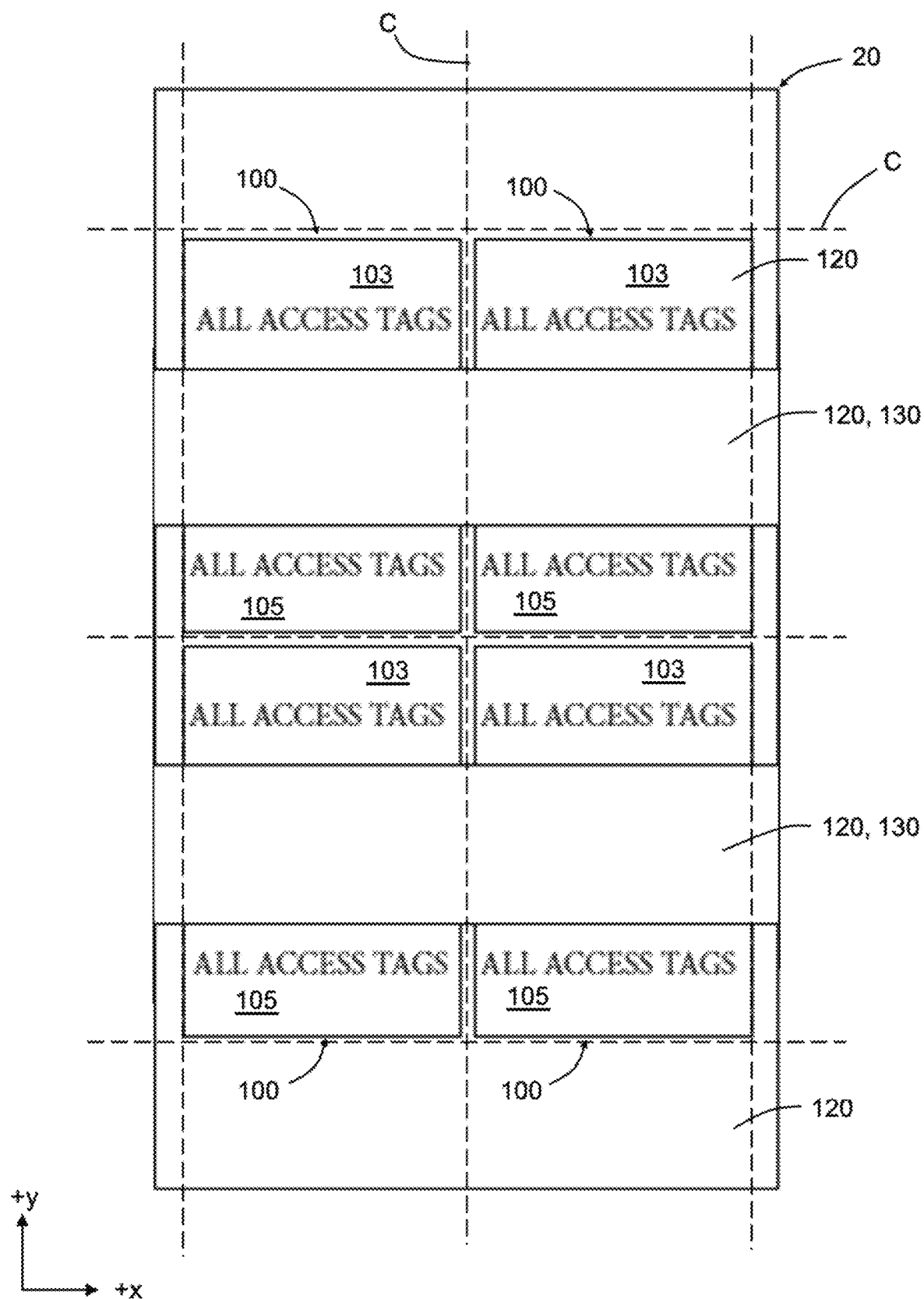
FIG. 6 is a front view of the plurality of laminated badges in FIG. 5 showing cut lines.
Figure 7:
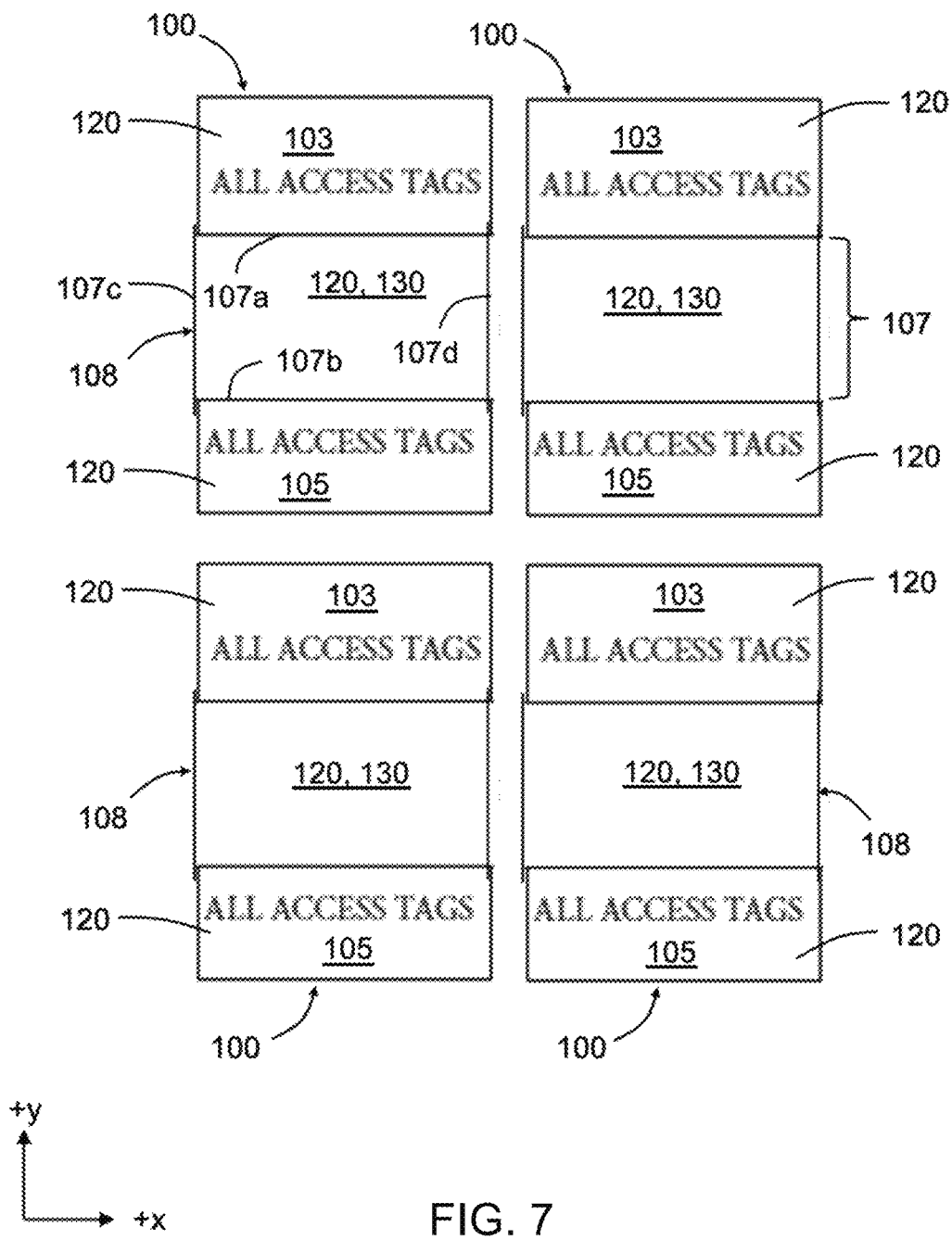
FIG. 7 is a front view of a plurality of badges with side loading front pockets in accordance with the teachings of the present disclosure.

Referring now to FIG. 6, the plurality of printed substrates 100 in FIG. 5 on the panel 20 is shown, along with cut lines 'C'. That is, the dotted lines 'C' in FIG. 6 show where cuts are made along outer edges of and between each of the plurality of printed substrates 100. Also, the plurality of printed substrates 100 after being cut from the panel 20 and forming individual badges 10 (FIGS. 1A-1C) and having the side loading pocket 108 are shown in FIG. 7. In some variations, the plurality of printed substrates 100 cut from the panel 20 are further processed, e.g., die cut or table cut to form additional features such as rounded corners and apertures, among others.

Figure 8:
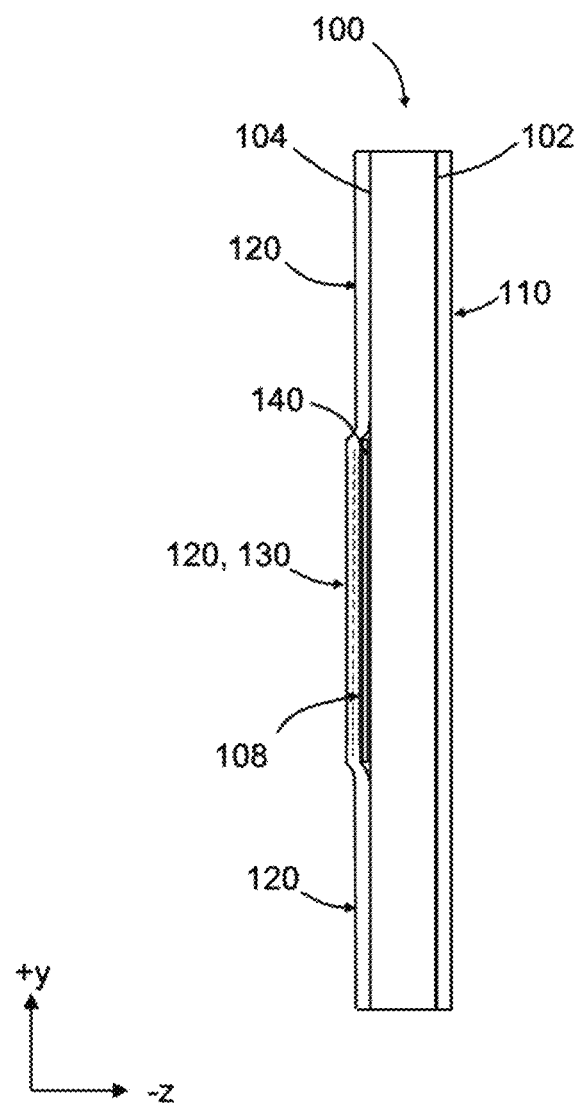
FIG. 8 is a side view of a badge with a side loading front pocket in accordance with the teachings of the present disclosure.

Referring now to FIG. 8, a side view of one of the badges 10 is shown. The badge 10 has the side loading pocket 108 on the front side 104 of the printed substrate 100 and the printed insert 140 is disposed in the side loading pocket 108. And as shown in FIG. 8 the front side laminate sheet 120 and the back side laminate sheet 110 of the badge 100 are not laminated directly to each other.

Figure 9:
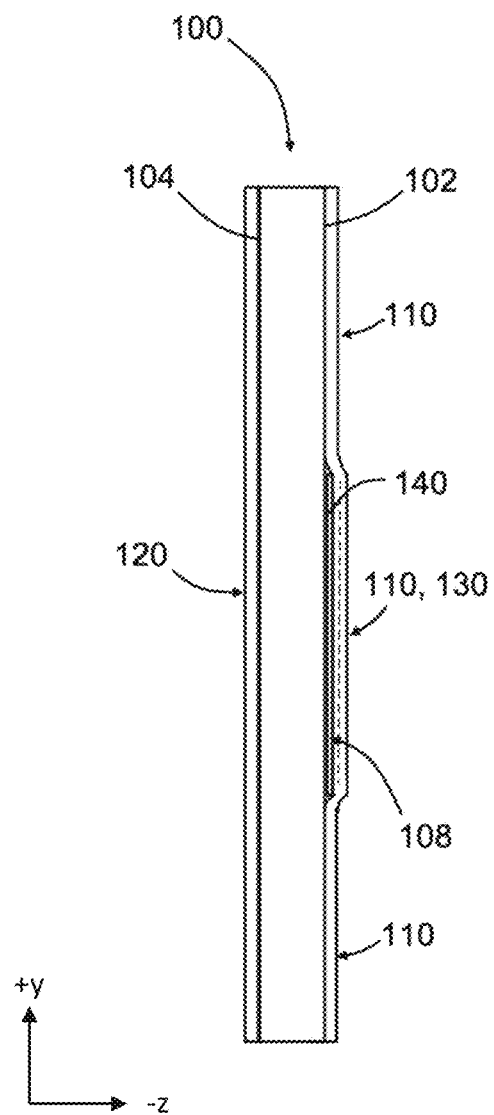
FIG. 9 is a side view of a badge with a side loading back pocket in accordance with the teachings of the present disclosure.

In another form of the present disclosure, a side loading pocket 108 is on the back side 102 of the printed substrate 100 as shown in FIG. 9. And as shown in FIG. 9 the front side laminate sheet 120 and the back side laminate sheet 110 of the badge 100 are not laminated directly to each other.

Figure 10:
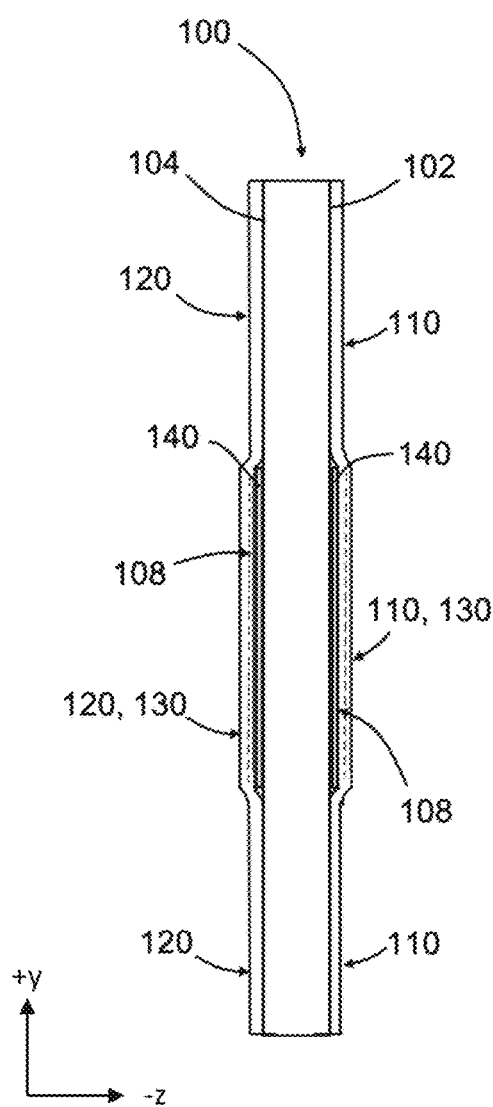
FIG. 10 is a side view of a badge with a side loading front pocket and a side loading back pocket in accordance with the teachings of the present disclosure.

In still another form of the present disclosure, a side loading pocket 108 is on the front side 104 of the printed substrate 100 and another side loading pocket 108 is on the back side 102 of the printed substrate 100 as shown in FIG. 10. And as shown in FIG. 10 the front side laminate sheet 120 and the back side laminate sheet 110 of the badge 100 are not laminated directly to each other.

Figure 11A:
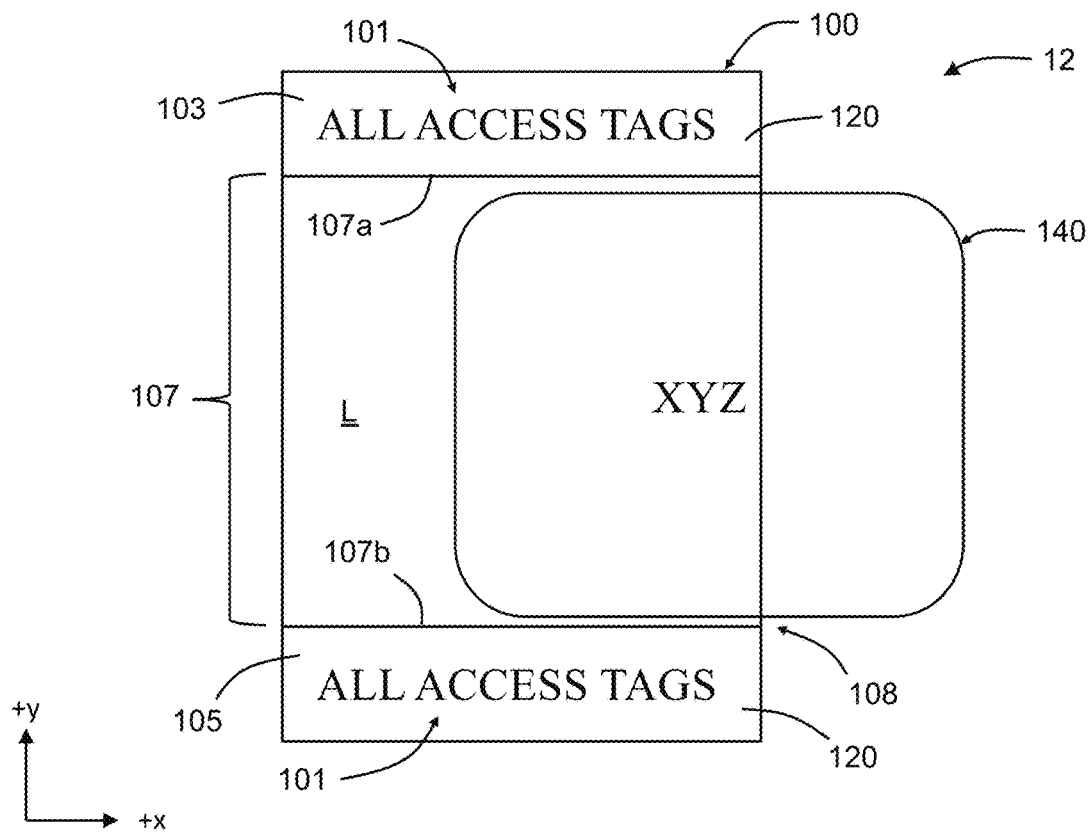
FIG. 11A is a front view of a badge with a side loading pocket in accordance with the teachings of the present disclosure.
Figure 11B:
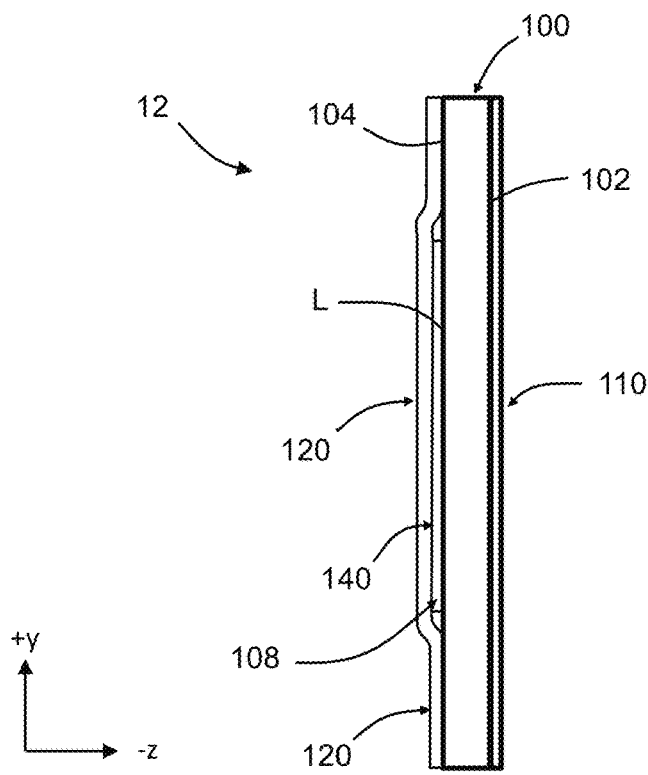
FIG. 11B is a side view of the badge in FIG. 11A.

Referring now to FIGS. 11A and 11B, a badge 12 (e.g., an event badge) according to still yet another form of the present disclosure is shown. Particularly, the badge 12 includes the printed substrate 100 with the top section 103, the bottom section 105, and the pocket section 107. In some variations of the present disclosure, the top section 103 and/or the bottom section 105 include indicia and/or an image 101, and an aperture 109 (not shown in FIGS. 11A-11B) for assisting in attaching (e.g., hanging or pinning) the badge to an individual. Also, the pocket section 107 is bounded by a top (+y direction) seal 107a and a bottom (−y direction) seal 107b such that the side loading pocket 108 is provided. However, and unlike the badge 10 discussed above, a barrier sheet 130 is not included or used to form the pocket section. Particularly, and in the alternative to using a barrier sheet 130 to inhibit or prevent the front side laminate sheet 120 from bonding to the printed substrate at the pocket section 107, a clear or white non-adhesive 1' is disposed onto the pocket section 107 of the front side 104 of the printed substrate 100 prior to laminating the front side laminating sheet 120 onto the front side 104. Accordingly, bonding of the front side laminate sheet 120 onto the pocket section 107 of the front side 104 is inhibited during laminating such that a printed insert 140 can be disposed in the side loading pocket 108.

The badge 12, i.e., a plurality of badges 12, is formed similarly to the forming of badges 10 discussed above with respect to FIGS. 3-7, except for the use of the barrier sheet 130. Instead, the clear or white non-adhesive L is disposed (e.g., sprayed, printed, and/or coated) on predefined pocket sections 107 on the panel 20 comprising a plurality of printed substrates 100 prior to feeding the panel 20, the back side laminate sheet 110, and the front side laminate sheet 120 into the laminator 200. Non-limiting examples of the clear non-adhesive includes liquids and emulsions, among others, containing silicon, polytetrafluoroethylene (PTFE), fluorinated ethylene propylene copolymer (FEP), perfluoroalkoxy (PFA), and/or poly(ethene-co-tetrafluoroethene) (ETFE), among others.

As the panel 20 and the back side laminate sheet 110 pass through the laminator 200, a combination of heat provided by the laminator 200 and the adhesive 116 on the inner surface 114 of the back side laminate sheet 110 result in lamination (i.e., bonding) of the back side laminate sheet 110 to the back side 102 of each of the printed substrates 100. Also, as the panel 20 and the front side laminate sheet 120 pass through the laminator 200, a combination of heat provided by the laminator 200 and the adhesive 126 on the inner surface 124 of the front side laminate sheet 120 result in lamination of the front side laminate sheet 120 to the top section 103 and the bottom section 105 on the front side 104 of each of the printed substrates 100. However, the front side laminate sheet 120 does not laminate to the front side 104 of each of the printed substrates 100 below (−y direction) the top section 103 and above (+y direction) the bottom section 105. Accordingly, a non-laminated area (i.e., the pocket section 107 is provided or defined between the top section 103 and bottom section 105. Also, the plurality of printed substrates 100 on the panel 20 is cut along cut lines (e.g., see cut lines 'C' in FIG. 6) such that a side loading pocket 108 is formed for each of the badges 12 and a printed insert 140 can be inserted in the side loading pocket 108.

Figure 12A:
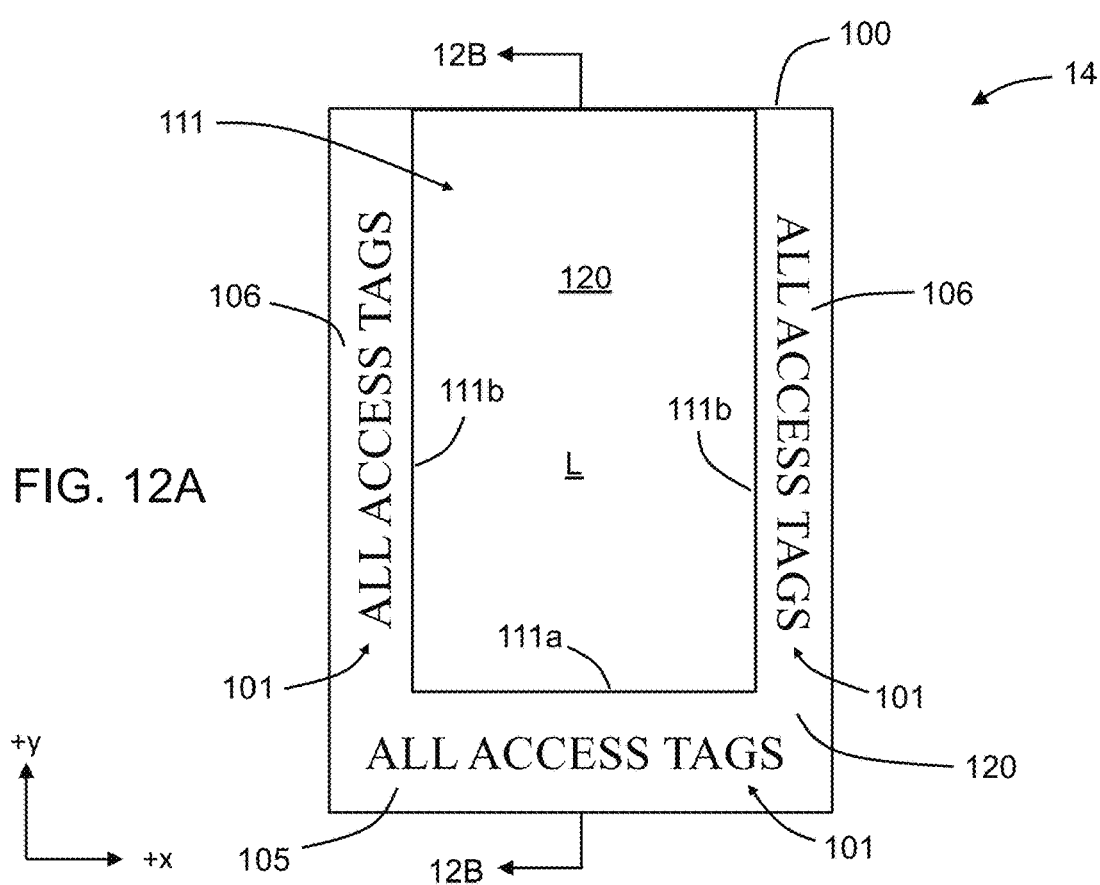
FIG. 12A is a front view of a badge with a top loading pocket in accordance with the teachings of the present disclosure.
Figure 12B:
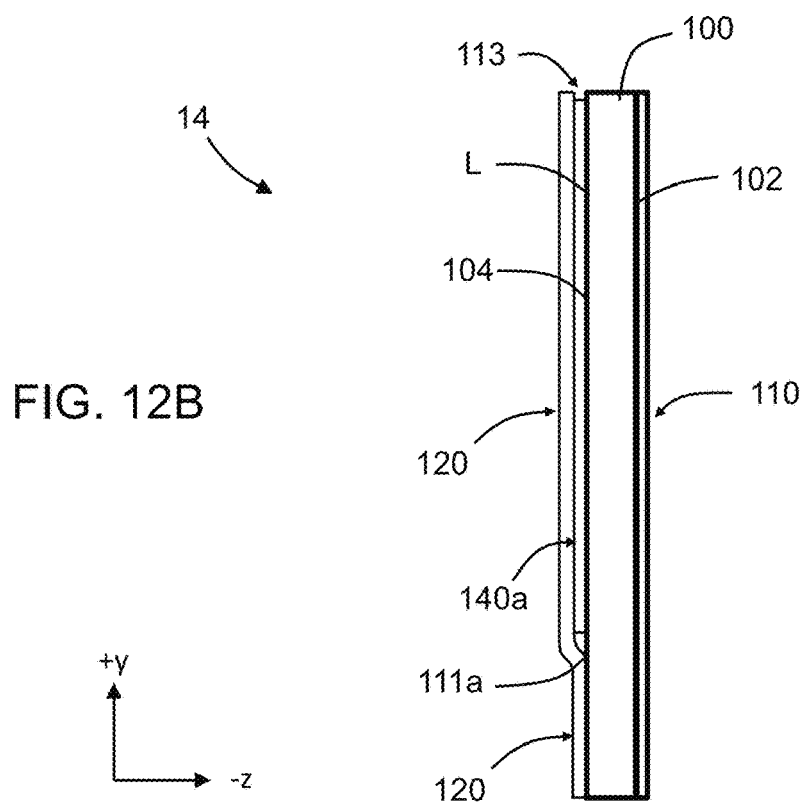
FIG. 12B is a side sectional view (without cross-hatching) of section 12B-12B in FIG. 12A.

Referring to FIGS. 12A and 12B, a badge 14 (e.g., an event badge) according to another form of the present disclosure is shown. Particularly, the badge 14 includes the printed substrate 100 with a bottom section 105, a pair of side sections 106 and a pocket section 111. In some variations of the present disclosure, the bottom section 105 and/or the pair of side sections 106 include indicia and/or an image 101, and an aperture 109 (not shown in FIGS. 12A-12B) for assisting in attaching (e.g., hanging or pinning) the badge to an individual. Also, the pocket section 111 is bounded by a bottom (−y direction) seal 111a and a pair of side seals 111b such that a top loading pocket 113 is provided.

The badge 14, i.e., a plurality of badges 14, is formed similarly to the forming of badges 10 discussed above with respect to FIGS. 3-7, except for the use of the barrier sheet 130. Instead, the clear non-adhesive liquid L is disposed (e.g., sprayed, printed, and/or coated) on predefined pocket sections 111 on the panel 20 comprising a plurality of printed substrates 100 prior to feeding the panel 20, the back side laminate sheet 110, and the front side laminate sheet 120 into the laminator 200. As the panel 20 and the back side laminate sheet 110 pass through the laminator 200, a combination of heat provided by the laminator 200 and the adhesive 116 on the inner surface 114 of the back side laminate sheet 110 result in lamination (i.e., bonding) of the back side laminate sheet 110 to the back side 102 of each of the printed substrates 100. Also, as the panel 20 and the front side laminate sheet 120 pass through the laminator 200, a combination of heat provided by the laminator 200 and the adhesive 126 on the inner surface 124 of the front side laminate sheet 120 result in lamination of the front side laminate sheet 120 to the bottom section 105 and the pair of side sections 106 on the front side 104 of each of the printed substrates 100. However, the front side laminate sheet 120 does not laminate to the front side 104 of each of the printed substrates 100 above (+y direction) the bottom section 105 and between the pair of side sections 106. Accordingly, a non-laminated area (i.e., the pocket section 111) is provided or defined above the bottom section 105 and between the pair of side sections 106. Also, the plurality of printed substrates 100 on the panel 20 is cut along cut lines (e.g., see cut lines 'C' in FIG. 6) such that a top loading pocket 113 (FIG. 12B) is formed for each of the badges 14 and a printed insert 140a can be inserted in the top loading pocket 113.

Figure 13A:
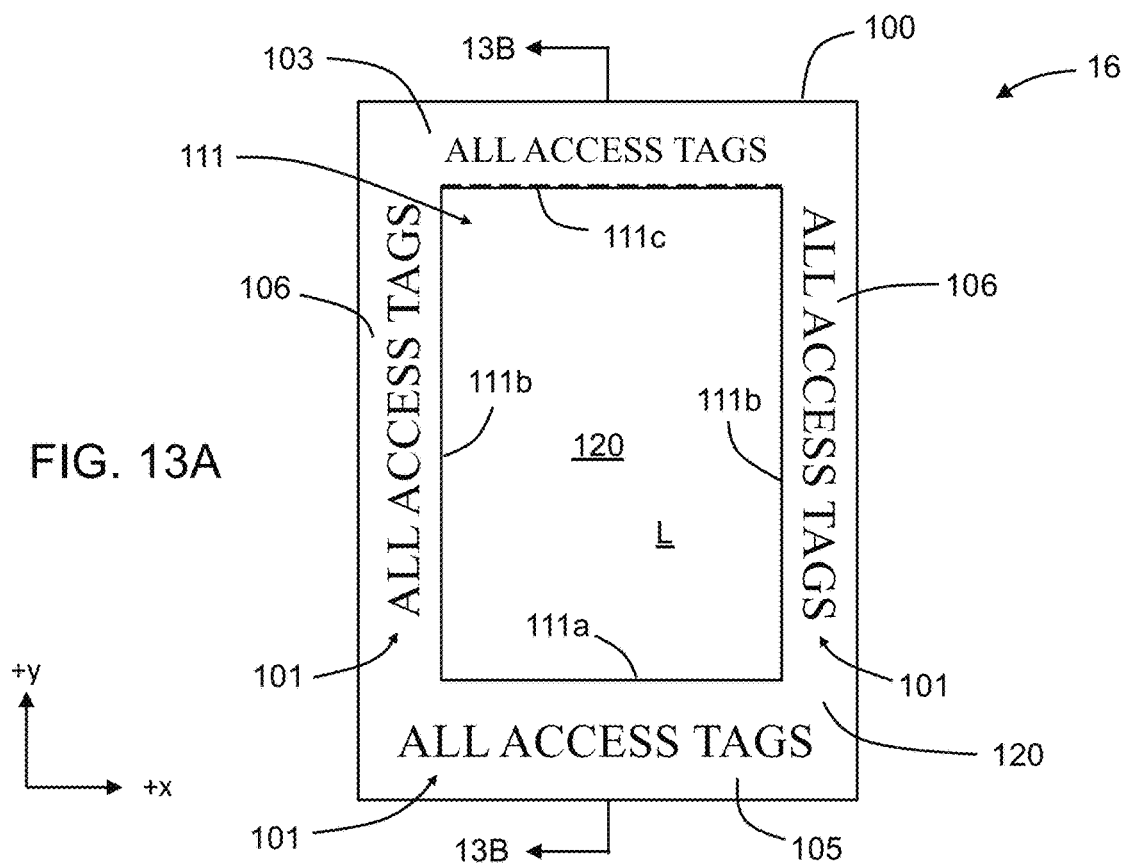
FIG. 13A is a front view of a badge with a top loading pocket in accordance with the teachings of the present disclosure.
Figure 13B:
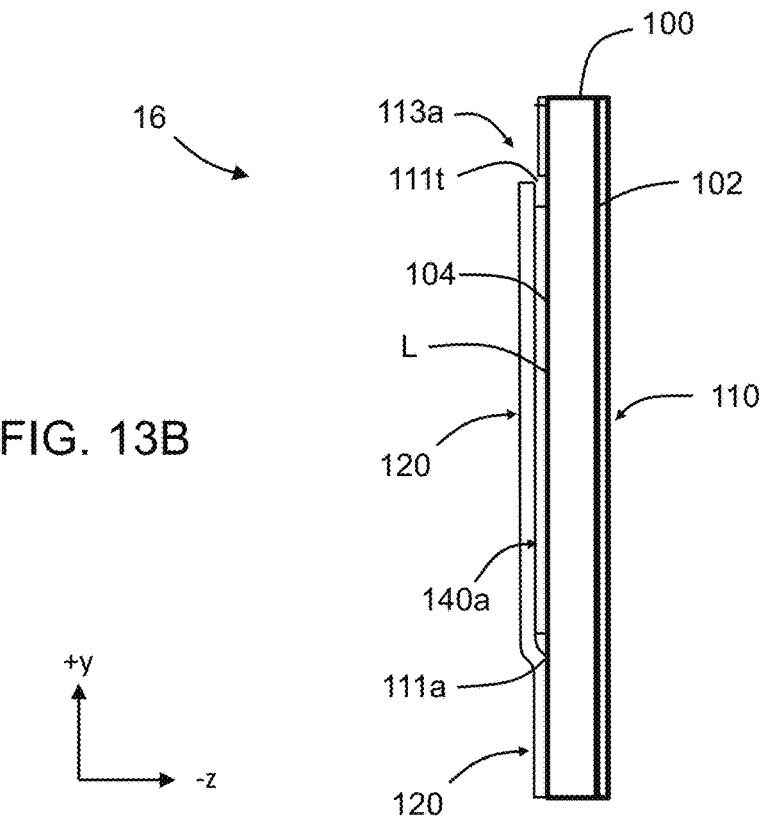
FIG. 13B is a side sectional view (without cross-hatching) of section 13B-13B in FIG. 13A.

Referring to FIGS. 13A and 13B, a badge 16 (e.g., an event badge) according to still another form of the present disclosure is shown. Particularly, the badge 16 includes the printed substrate 100 with a top section 103, a bottom section 105, a pair of side sections 106 and a pocket section 111. In some variations of the present disclosure, the top section 103, the bottom section 105 and/or the pair of side sections 106 include indicia and/or an image 101, and an aperture 109 (not shown in FIGS. 13A-13B) for assisting in attaching (e.g., hanging or pinning) the badge to an individual. Also, the pocket section 111 is bounded by a bottom (−y direction) seal 111a and a pair of side seals 111b such that a top loading pocket 113 is provided.

The badge 16, i.e., a plurality of badges 16, is formed similarly to the forming of badges 14 discussed above with respect to FIGS. 12A-12B, except for the printed substrate 100 (and the badge 16) includes a top section 103. Accordingly, as the panel 20 and the front side laminate sheet 120 pass through the laminator 200, a combination of heat provided by the laminator 200 and the adhesive 126 on the inner surface 124 of the front side laminate sheet 120 result in lamination of the front side laminate sheet 120 to the top section 103, the bottom section 105 and the pair of side sections 106 on the front side 104 of each of the printed substrates 100. However, the front side laminate sheet 120 does not laminate to the front side 104 of each of the printed substrates 100 between the top section 103 and the bottom section 105, and between the pair of side bottom sections 106. Accordingly, a non-laminated area (i.e., a pocket section 111) is provided or defined between the top section 103, the bottom section 105 and the pair of side sections 106. Also, the plurality of printed substrates 100 on the panel 20 is cut along cut lines (e.g., see cut lines 'C' in FIG. 6) and the front laminate sheet 120 is cut (e.g., a "kiss" cut) at cut line 111c (FIG. 13A) such that the pocket region 111 has a top opening 111t and a top loading pocket 113a is formed.

Figure 14:
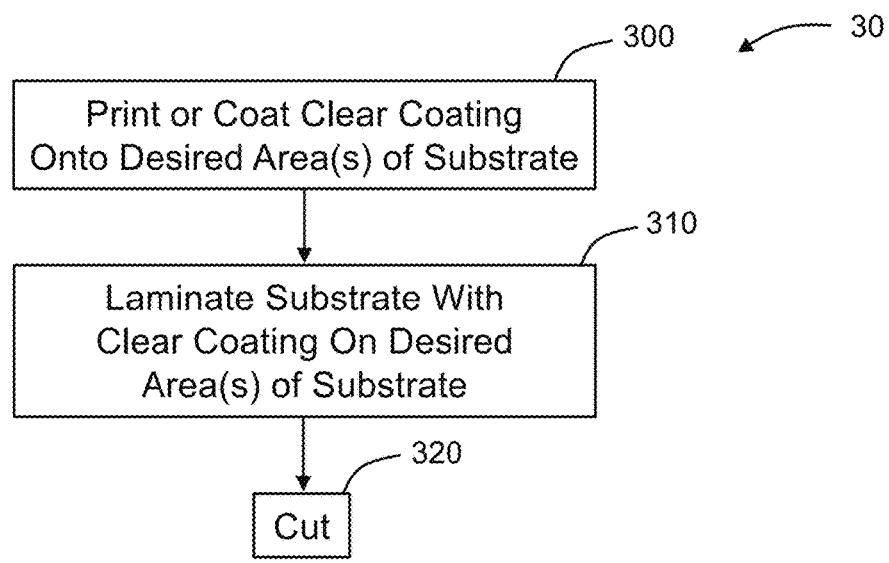
FIG. 14 is a flow chart for a method of making a badge in accordance with the teachings of the present disclosure.

Referring to FIG. 14, a flow chart for a method 30 a manufacturing the badges, 12-16 is shown. The method 30 includes printing, spraying and/or coating a clear non-adhesive coating onto desired areas (e.g., predefined pocket areas) of a panel such that non-stick areas are formed at 300. A front side laminate sheet is laminated onto a front side of the panel and in some variations a back side laminate sheet is laminated onto a back side of the panel at 310. The laminated panel is cut along cut lines such that a plurality of laminated printed substrates with non-stick areas are formed at 320. In addition, the front side laminate sheet is cut along at least one edge of each non-stick area such that a plurality of badges with side loading pockets or a top loading pockets is formed.

Figure 15:
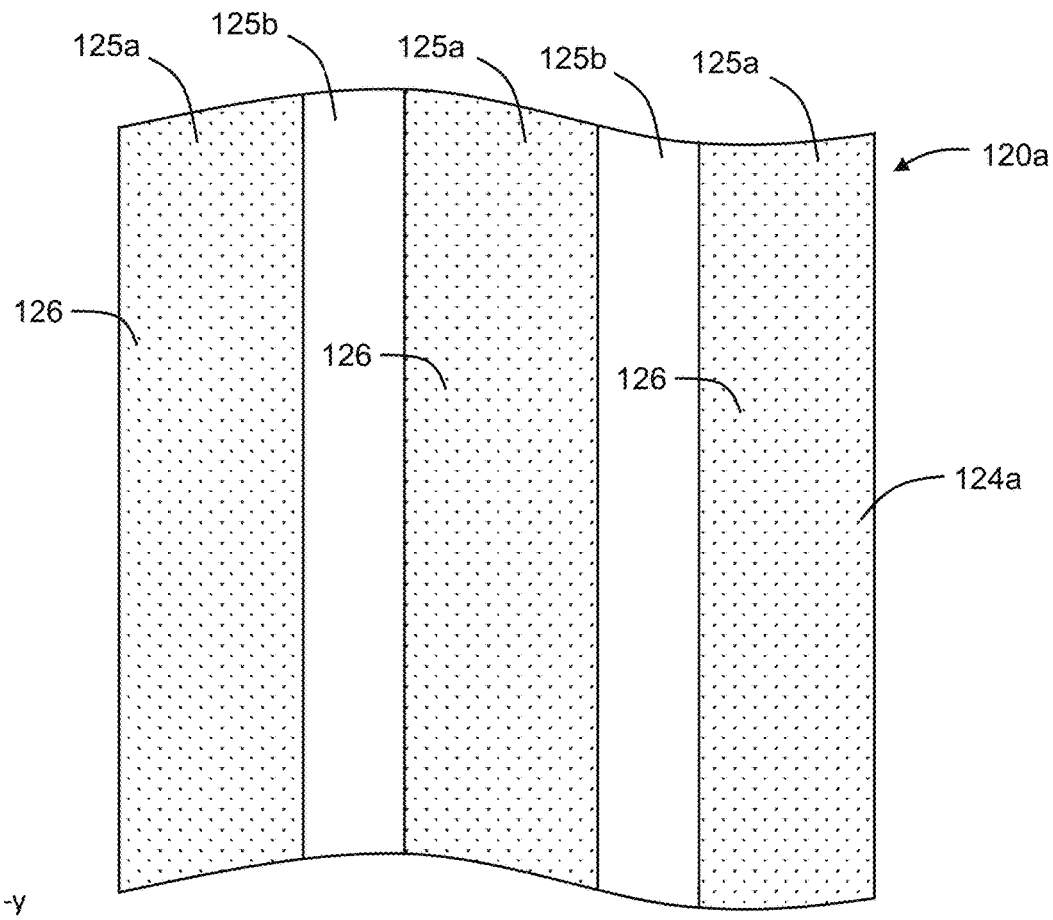
FIG. 15 is a back view of a front laminate sheet in accordance with the teachings of the present disclosure.

Referring to FIG. 15, in some variations the pocket sections (i.e., the non-stick areas) are formed by laminating a front side laminate sheet 120a with one or more non-adhesive areas or strips 125b (referred to hereafter simply as "non-adhesive strips 125b" or "non-adhesive strip 125b") onto a front side of a panel 20. Particularly, the front side laminate sheet 120a has at least one adhesive section, area, or strip 125a (referred to hereafter simply as "adhesive strip 125a") and at least one non-adhesive strip 125b on an inner surface 124a. In some variations, the at least one non-adhesive section strip 125b extends along a length (x direction) of the front side laminate sheet 120a such that the at least one non-adhesive strip 125b is fed into the laminator with a similar orientation as the barrier sheet 130 shown in FIG. 4. And while FIG. 4 shows the panel 20 being fed into the laminator 200 sideways, i.e., such that badges 10 with side loading pockets 108 are formed, it should be understood that the panel 20 can be fed into the laminator 200 lengthwise such that badges 14-16 with top loading pockets 113 are formed.

Figure 16:
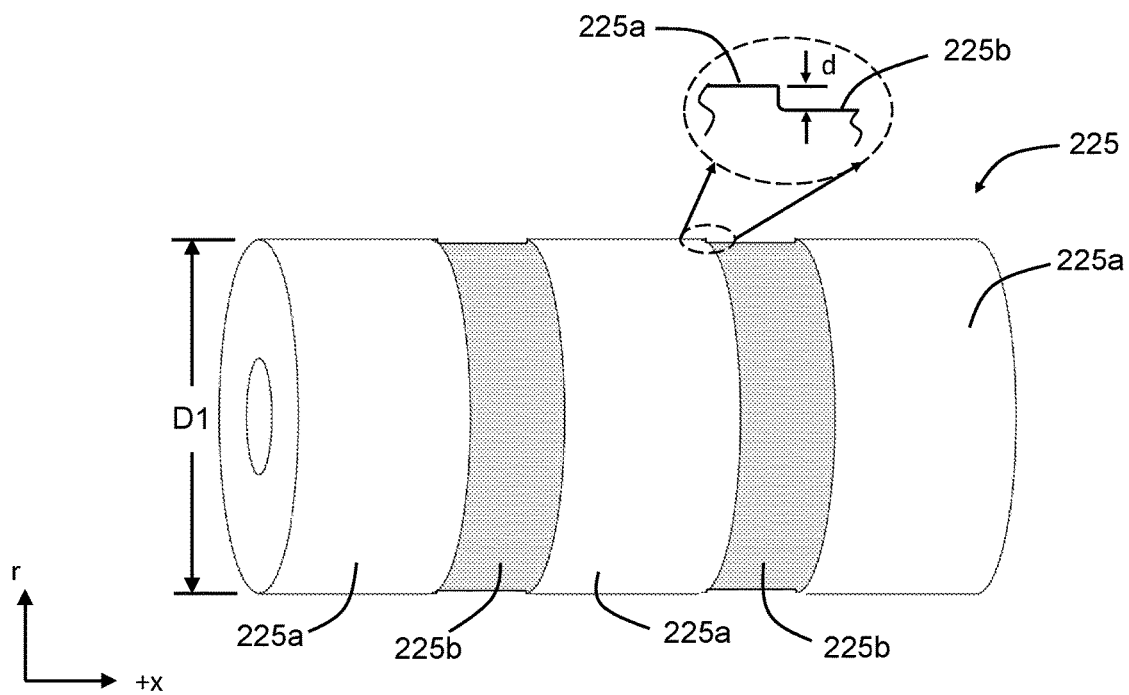
FIG. 16 is a perspective view of a roller for making the front laminate sheet in FIG. 15.

In some variations, the front side laminate sheet 120a is formed using a roller 225 shown in FIG. 16. Particularly, the roller 225 has one or more first sections 225a with a first diameter 'D1' and one or more second sections 225b with a second diameter 'D1-2d' less than the first diameter D1. In some variations the depth d is between 0.1 mm and 5.0 mm, for example, between 0.2 mm and 4.0 mm, between 0.5 mm and 3.0 mm or between 1.0 mm and 2.0 mm.

Figure 17:
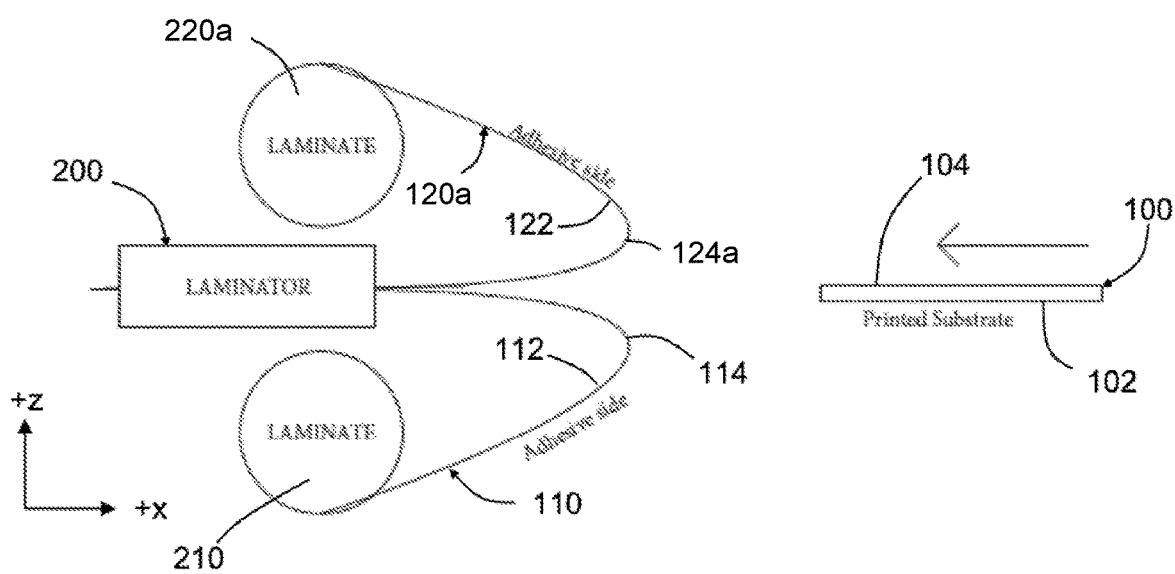
FIG. 17 a side view of a method for forming a badge in accordance with the teachings of the present disclosure.

Adhesive is transferred from the surface of the one or more first sections 225a to the at least one adhesive section, area, or strip 125a of the front side laminate sheet 120a. However, the one or more second sections 225b with the reduced diameter compared to the one or more first sections 225a result in adhesive not being applied to the at least one non-adhesive strip 125b of the front side laminate sheet 120a. In addition, the front side laminate sheet 120a can be formed and provided as a roll of laminate sheet 220a which is fed into the laminator 200 as shown in FIG. 17. Accordingly, and as described above with respect to FIG. 3, the printed substrate 100, the back side laminate sheet 110 from the roll of laminate sheet 210, and the front side laminate sheet 120a from the roll of laminate sheet 220a are fed into the laminator 200 to form the badges 14-16.

It should be understood from the teachings of the present disclosure that badges (e.g., on-site registration event badges) with one or more side loading pockets are provided and can be manufactured in an in-line process. That is, the pocket sections of the badges are formed during the laminating and cutting process(es) typically used for manufacturing of pre-registration badges. Stated differently, the same manufacturing process used for making pre-registration laminated badges (e.g., ID badges formed before an event) is used for making on-site registration laminated badges where a name tag is printed at the event and attached to the badge.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for making a badge comprising:
   laminating a panel comprising a plurality of printed substrates with a back side laminate sheet and a front side laminate sheet, wherein at least one barrier sheet is disposed between the front side laminate sheet and the plurality of printed substrates; and
   cutting the laminated panel and forming individual badges, wherein the front side laminate sheet and the back side laminate sheet of each of the individual badges are not laminated directly to each other, each of the individual badges includes one of the plurality of printed substrates and a side loading pocket section formed between the front side laminate sheet and the printed substrate of a respective individual badge where the at least one barrier sheet is disposed, wherein:
      the panel, the back side laminate sheet, the front side laminate sheet, and the at least one barrier sheet are fed into a laminator such that the back side laminate sheet is laminated to a back side of the panel, and
      the front side laminate sheet is laminated to a front side of the panel except where the at least one barrier sheet is positioned between the front side laminate sheet and the panel.

2. The method according to claim 1, wherein the at least one barrier sheet further comprises a barrier sheet laminated to the back side laminate sheet and another side loading pocket section is formed between the back side laminate sheet and the printed substrate of the respective individual badge.

3. The method according to claim 1, wherein the back side laminate sheet comprises an adhesive layer on an inner surface of the back side laminate sheet and the front side laminate sheet comprises another adhesive layer on an inner surface of the front side laminate sheet.

4. The method according to claim 3, wherein an inner surface of the at least one barrier sheet facing the printed substrate of the respective individual badge is free of an adhesive layer.

5. The method according to claim 1, wherein more than 50% of an area of an inner surface of the at least one barrier sheet facing the printed substrate of the respective individual badge is not adhesively attached to the printed substrate.

6. The method according to claim 1, wherein more than 75% of an area of an inner surface of the at least one barrier sheet facing the printed substrate is not adhesively attached to the printed substrate of the respective individual badge.

7. The method according to claim 1 further comprising cutting the laminated panel along cut lines such that a side opening is formed between the at least one barrier sheet and the printed substrate of each of the individual badges.

8. The method according to claim 1 further comprising cutting the laminated panel along cut lines such that a pair of side openings are formed between the at least one barrier sheet and the printed substrate of each of the individual badges.

9. The method according to claim 1, wherein the at least one barrier sheet is laminated to the front side laminate sheet and not laminated to the panel.

10. A method for making a badge comprising:
    laminating a panel comprising a plurality of printed substrates with a back side laminate sheet and a front side laminate sheet, wherein at least one barrier sheet is disposed between the back side laminate sheet and the plurality of printed substrates and more than 50% of an area of an inner surface of the at least one barrier sheet facing the plurality of printed substrates is not adhesively attached to the plurality of printed substrates; and cutting the laminated panel and forming individual badges, wherein:

the front side laminate sheet and the back side laminate sheet of each of the individual badges are not laminated directly to each other, each of the individual badges includes one of the plurality of printed substrates and a side loading pocket section formed between the back side laminate sheet and the printed substrate of a respective individual badge where the at least one barrier sheet is disposed, wherein:

the panel, the back side laminate sheet, the front side laminate sheet, and the at least one barrier sheet are fed into a laminator such that the front side laminate sheet is laminated to a front side of the panel, and the back side laminate sheet is laminated to a back side of the panel except where the at least one barrier sheet is positioned between the back side laminate sheet and the panel.

11. The method according to claim 10, wherein the at least one barrier sheet further comprises a barrier sheet laminated to the front side laminate sheet and another side loading pocket section is formed between the front side laminate sheet and the printed substrate of the respective individual badge.

12. The method according to claim 10, wherein an inner surface of the at least one barrier sheet facing the printed substrate of the respective individual badge is free of an adhesive layer.

13. A method for making a badge comprising:

laminating a panel comprising a plurality of printed substrates with a back side laminate sheet and a front side laminate sheet, wherein at least one barrier sheet is disposed between the front side laminate sheet and the plurality of printed substrates and more than 90% of an area of an inner surface of the at least one barrier sheet facing the plurality of printed substrates is not adhesively attached to the plurality of printed substrates; and cutting the laminated panel and forming individual badges, wherein the front side laminate sheet and the back side laminate sheet of each of the individual badges are not laminated directly to each other, each of the individual badges includes one of the plurality of printed substrates and a side loading pocket section formed between the front side laminate sheet and the printed substrate of a respective individual badge where the at least one barrier sheet is disposed, wherein:

the panel, the back side laminate sheet, the front side laminate sheet, and the at least one barrier sheet are fed into a laminator such that the back side laminate sheet is laminated to a back side of the panel, and the front side laminate sheet is laminated to a front side of the panel except where the at least one barrier sheet is positioned between the front side laminate sheet and the panel.

14. The method according to claim 13, wherein the at least one barrier sheet further comprises a barrier sheet laminated to the back side laminate sheet and another side loading pocket section is formed between the back side laminate sheet and the printed substrate of the respective individual badge.

* * * * *